US012798714B2

(12) United States Patent
Choi

(10) Patent No.: US 12,798,714 B2
(45) Date of Patent: Nov. 17, 2026

(54) DRIVE MODULE FOR BICYCLE, CARGO MODULE FOR BICYCLE, AND CARGO BICYCLE

(71) Applicant: HYUNDAI MOBIS CO., LTD., Seoul (KR)

(72) Inventor: Joo Seong Choi, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 365 days.

(21) Appl. No.: 18/583,108

(22) Filed: Feb. 21, 2024

(65) Prior Publication Data

US 2025/0091686 A1 Mar. 20, 2025

(30) Foreign Application Priority Data

Sep. 20, 2023 (KR) ........................ 10-2023-0125698

(51) Int. Cl.

| | |
|---|---|
| ***B62K 19/32*** | (2006.01) |
| ***B62K 19/18*** | (2006.01) |
| ***B62K 19/40*** | (2006.01) |
| *B62K 21/24* | (2006.01) |
| *B62M 6/90* | (2010.01) |

(52) U.S. Cl.

CPC .............. *B62K 19/32* (2013.01); *B62K 19/18* (2013.01); *B62K 19/40* (2013.01); *B62K 21/24* (2013.01); *B62M 6/90* (2013.01)

(58) Field of Classification Search

CPC ........ B62K 19/32; B62K 19/18; B62K 19/40; B62K 21/24; B62K 5/06; B62K 19/30; B62K 5/05; B62K 5/08; B62K 7/04; B62K 13/04; B62K 13/08; B62K 27/02; B62K 27/12; B62M 6/90; B62M 6/55; B62M 6/40; B62J 43/13; B62J 43/26; B62J 43/28; B62J 45/00

See application file for complete search history.

(56) References Cited

U.S. PATENT DOCUMENTS 4,044,852 A * 8/1977 Lewis ...................... B62M 6/55 180/68.5
11,873,044 B2 * 1/2024 Kim ...................... B62K 13/00
D1,079,557 S * 6/2025 DeBaker ...................... D12/112
D1,103,849 S * 12/2025 Shen ...................... D12/111
2015/0307151 A1* 10/2015 Chao ...................... B62K 19/18 280/287
2018/0037296 A1* 2/2018 Hamamoto ......... F16F 15/1245
2019/0023347 A1* 1/2019 Block ...................... B62K 5/06
2021/0016854 A1* 1/2021 Thompson ........... B62K 15/006
2022/0089244 A1* 3/2022 Froidevaux ............... B62L 3/00
2023/0074100 A1* 3/2023 Melville-Brown ...... B62J 43/20
2023/0356799 A1* 11/2023 Bazak, Sr. ................ B62J 1/14
2024/0092448 A1* 3/2024 Maor ..................... B62K 5/007

FOREIGN PATENT DOCUMENTS

JP 2007-0076400 A 3/2007

* cited by examiner

*Primary Examiner* — Valentin Neacsu
*Assistant Examiner* — Marlon A Arce
(74) *Attorney, Agent, or Firm* — Morgan, Lewis & Bockius LLP

(57) ABSTRACT

A drive module for a bicycle according to an aspect of the present invention, the drive module including a bicycle frame comprising a beam insertion hole into which a connecting beam is removably inserted, a main shaft rotatably provided on the bicycle frame, a rear wheel rotatably supported on the bicycle frame and configured to be rotated by rotational force from the main shaft, and a fork rotatably coupled to the bicycle frame.

10 Claims, 10 Drawing Sheets

DRIVE MODULE FOR BICYCLE, CARGO MODULE FOR BICYCLE, AND CARGO BICYCLE

CROSS-REFERENCE TO RELATED APPLICATION

This application claims the benefit under 35 U.S.C. § 119(a) of priority to Korean Patent Application No. 10-2023-0125698, filed on Sep. 20, 2023 in the Korean Intellectual Property Office, the entire disclosure of which is incorporated herein by reference for all purposes.

BACKGROUND

Field

The present disclosure relates to a drive module for a bicycle, a cargo module for a bicycle detachably coupled to the drive module for a bicycle, and a cargo bicycle including the drive module for a bicycle and the cargo module for a bicycle.

Discussion of the Related Art

A cargo bicycle is a bicycle having a large and sturdy cargo area for carrying luggage. The cargo bicycle may be designed with three wheels so as to be ridden safely without losing balance, even when carrying a heavy load.

On the other hand, such a cargo bicycle is bulky and slow and therefore is unsuitable for exercising or recreational riding, even when unloaded. It is therefore necessary to purchase a two-wheel bicycle separately from the cargo bicycle.

A background technology of the present disclosure is disclosed in Japanese Patent Application Publication No. 2007-076400 (published on Mar. 29, 2007, entitled “Carrier with Bicycle”).

SUMMARY

Various embodiments are directed to a drive module for a bicycle suitable for use with both a two-wheeled bicycle and a cargo bicycle, a cargo module for a bicycle configured to be detachably coupled to the drive module for a bicycle to convert a regular bicycle into a cargo bicycle, and a cargo bicycle including the drive module for a bicycle and the cargo module for a bicycle.

According to the present disclosure, there is provided a drive module for a bicycle, the driving module including: a bicycle frame including a beam insertion hole into which a connecting beam is removably inserted; a main shaft rotatably provided on the bicycle frame; a rear wheel rotatably supported on the bicycle frame and configured to be rotated by rotational force from the main shaft; and a fork rotatably coupled to the bicycle frame.

The drive module may further include: an electric actuator configured to rotate the main shaft using electrical energy; and a main battery storing electrical energy to be supplied to the electric actuator.

The connecting beam may include a beam-side terminal for an electrical connection. The bicycle frame may include therein a hole-side terminal for an electrical connection. When the connecting beam is inserted into the beam insertion hole, the beam-side terminal and the hole-side terminal may contact each other to establish an electrical connection.

The drive module may further include a coupling pin configured to extend through the bicycle frame and the connecting beam to prevent the connecting beam from being removed from the beam insertion hole.

According to the present disclosure, also provided is a cargo module for a bicycle, the cargo module including: a base; a connecting beam protruding from the base and configured to be inserted into a beam insertion hole provided in a drive module for a bicycle; a fork connecting part configured such that one side thereof is rotatably supported on the base and the other side thereof is detachably coupled to the drive module for the bicycle; a pair of cargo front wheels disposed on both sides of the base in a widthwise direction with a space therebetween; and a steering unit configured to change a steering angle of the pair of cargo front wheels to correspond to a rotation angle of the fork connecting part.

The cargo module may further include an auxiliary battery storing electrical energy.

The drive module for the bicycle may include therein a hole-side terminal for an electrical connection. The connecting beam may include a beam-side terminal for an electrical connection. When the connecting beam is inserted into the beam insertion hole, the beam-side terminal and the hole-side terminal may contact each other to establish an electrical connection.

According to the present disclosure, also provided is a cargo bicycle including: a drive module for a bicycle, wherein the driving module includes a bicycle frame including a beam insertion hole, a main shaft rotatably provided on the bicycle frame, a rear wheel rotatably supported on the bicycle frame and configured to be rotated by rotational force from the main shaft, and a fork rotatably coupled to the bicycle frame; and a cargo module for a bicycle, wherein the cargo module includes a base, a connecting beam protruding from the base and configured to be inserted into the beam insertion hole, a fork connecting part configured such that one side thereof is rotatably supported on the base and the other side thereof is detachably coupled to the fork, a pair of cargo front wheels disposed on both sides of the base in a widthwise direction with a space therebetween, and a steering unit configured to change a steering angle of the pair of cargo front wheels to correspond to a rotation angle of the fork connecting part.

The drive module for the bicycle may further include: an electric actuator configured to rotate the main shaft using electrical energy; and a main battery storing electrical energy to be supplied to the electric actuator.

The cargo module for the bicycle may further include an auxiliary battery storing electrical energy to be supplied to the electric actuator.

The drive module for the bicycle may include a hole-side terminal disposed within the bicycle frame. The cargo module for the bicycle may include a beam-side terminal disposed on the connecting beam. When the connecting beam is inserted into the beam insertion hole, the beam-side terminal and the hole-side terminal may contact each other to establish an electrical connection so that the main battery and the auxiliary battery are connected to each other in parallel.

The drive module for the bicycle may further include an electric actuator configured to rotate the main shaft using electrical energy, a main battery storing electrical energy to be supplied to the electric actuator, and a hole-side terminal disposed within the drive module for the bicycle. The cargo module for the bicycle may further include an auxiliary battery storing electrical energy to be supplied to the electric actuator and a beam-side terminal disposed on the connecting beam. When the connecting beam is inserted into the beam insertion hole, the beam-side terminal and the hole-side terminal may contact each other to establish an electrical connection so that the main battery and the auxiliary battery are connected to each other in parallel.

The drive module for the bicycle may further include a coupling pin configured to extend through the bicycle frame and the connecting beam to prevent the connecting beam from being removed from the beam insertion hole.

According to the present disclosure as set forth above, a user may use a cargo bicycle by coupling the drive module for the bicycle and the cargo module for the bicycle or use a recreational or transportation two-wheeled bicycle by coupling a front wheel to the drive module for the bicycle. Accordingly, costs may be reduced compared to the case in which the user purchases a cargo bicycle and a separate two-wheeled bicycle.

The cargo bicycle in which the drive module for the bicycle including the electric actuator and the main battery according to embodiments of the present disclosure and the cargo module for the bicycle including the auxiliary battery according to embodiments of the present disclosure are coupled may be used in a motorized mode for an extended time and carry heavy loads over long distances in an easy manner.

In the cargo bicycle according to embodiments of the present disclosure, the drive module for the bicycle further includes the hole-side terminal, the cargo module for the bicycle further includes the beam-side terminal, and when the connecting beam is fixedly inserted into the beam insertion hole, the hole-side terminal and the beam-side terminal contact each other to establish an electrical connection. After the connecting beam is inserted into the beam insertion hole and the connecting beam is fixed using the coupling pin, additional work of connecting the connector of the drive module for the bicycle and the connector of the cargo module for the bicycle is not required. Accordingly, conversion to the cargo bicycle may be facilitated, and the bicycle may be ridden safely without any accident in which the connectors are disconnected during the operation of the cargo bicycle.

DETAILED DESCRIPTION

Hereinafter, a drive module for a bicycle, a cargo module for a bicycle, and a cargo bicycle according to embodiments of the present disclosure will be described in detail with reference to the accompanying drawings. The terminologies used herein are intended to adequately describe exemplary embodiments of the present disclosure, and may vary depending on the intention of a user or an operator, practices of the art to which the present disclosure pertains, and the like. Therefore, the terminologies should be defined on the basis of the contents of the entire specification.

Figure 1:
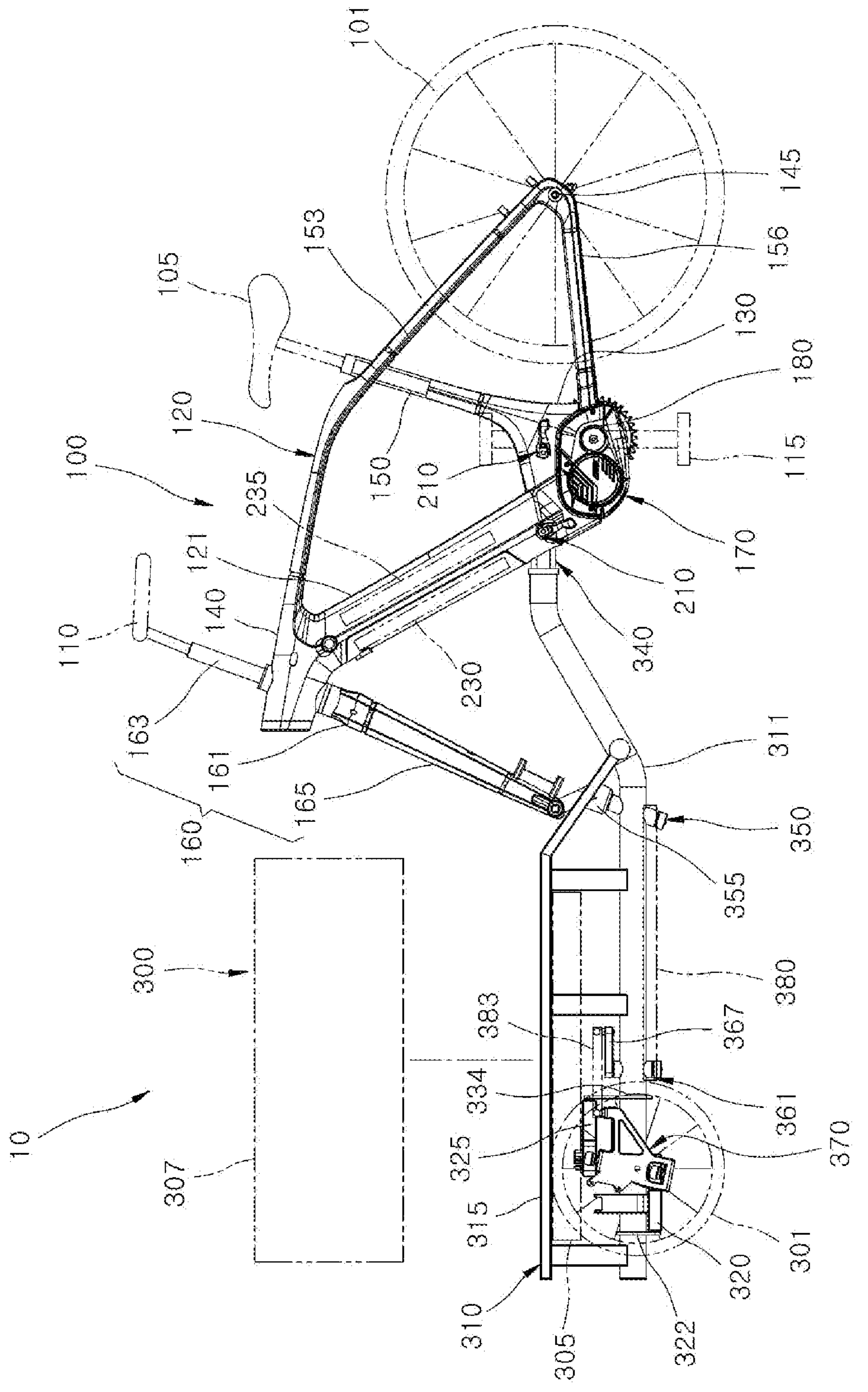
FIG. 1 is a left side view illustrating a cargo bicycle according to an embodiment of the present disclosure.
Figure 2:
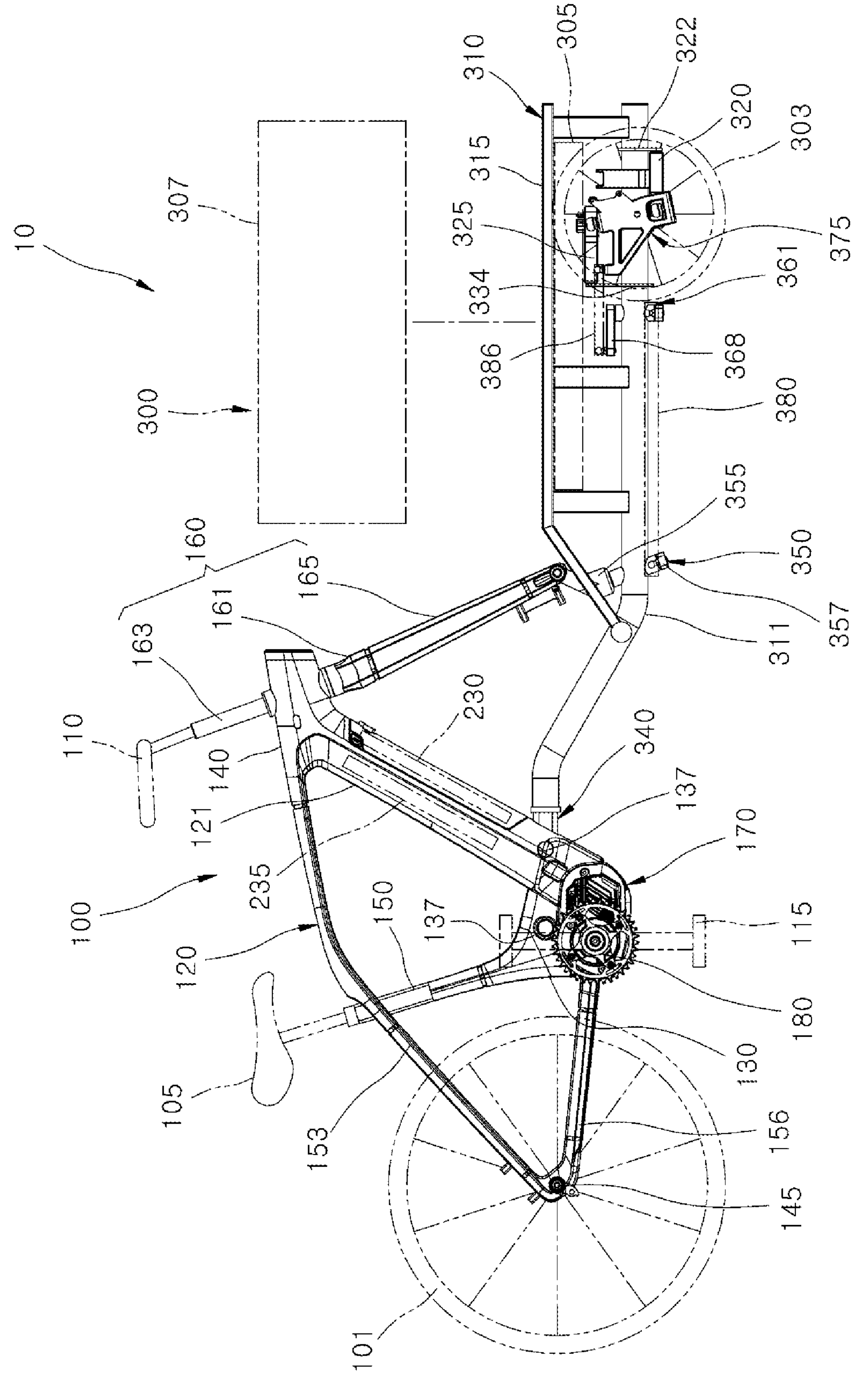
FIG. 2 is a right side view illustrating the cargo bicycle according to an embodiment of the present disclosure.
Figure 3:
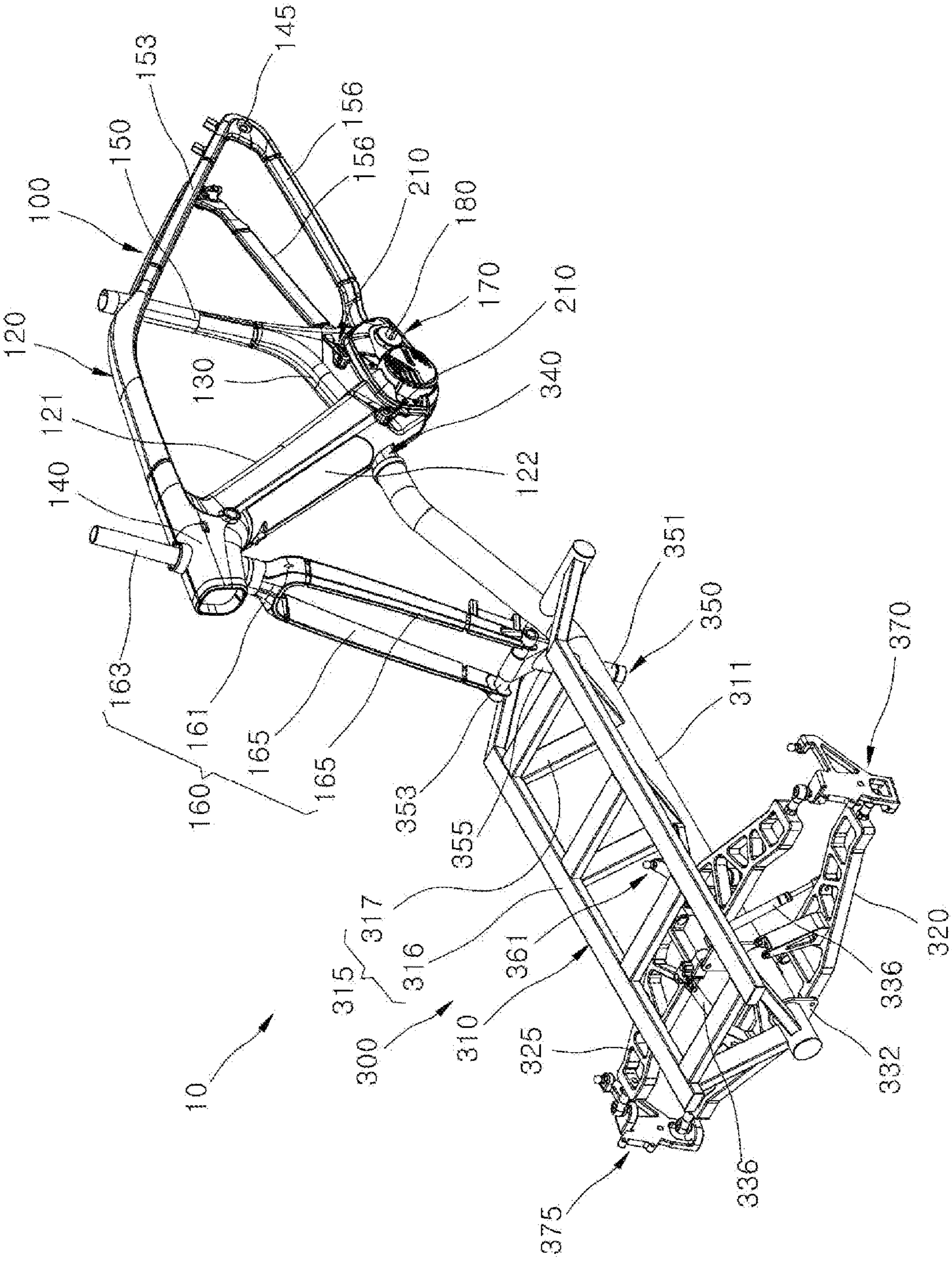
FIG. 3 is a perspective view of the cargo bicycle according to an embodiment of the present disclosure, viewed from the left.
Figure 4:
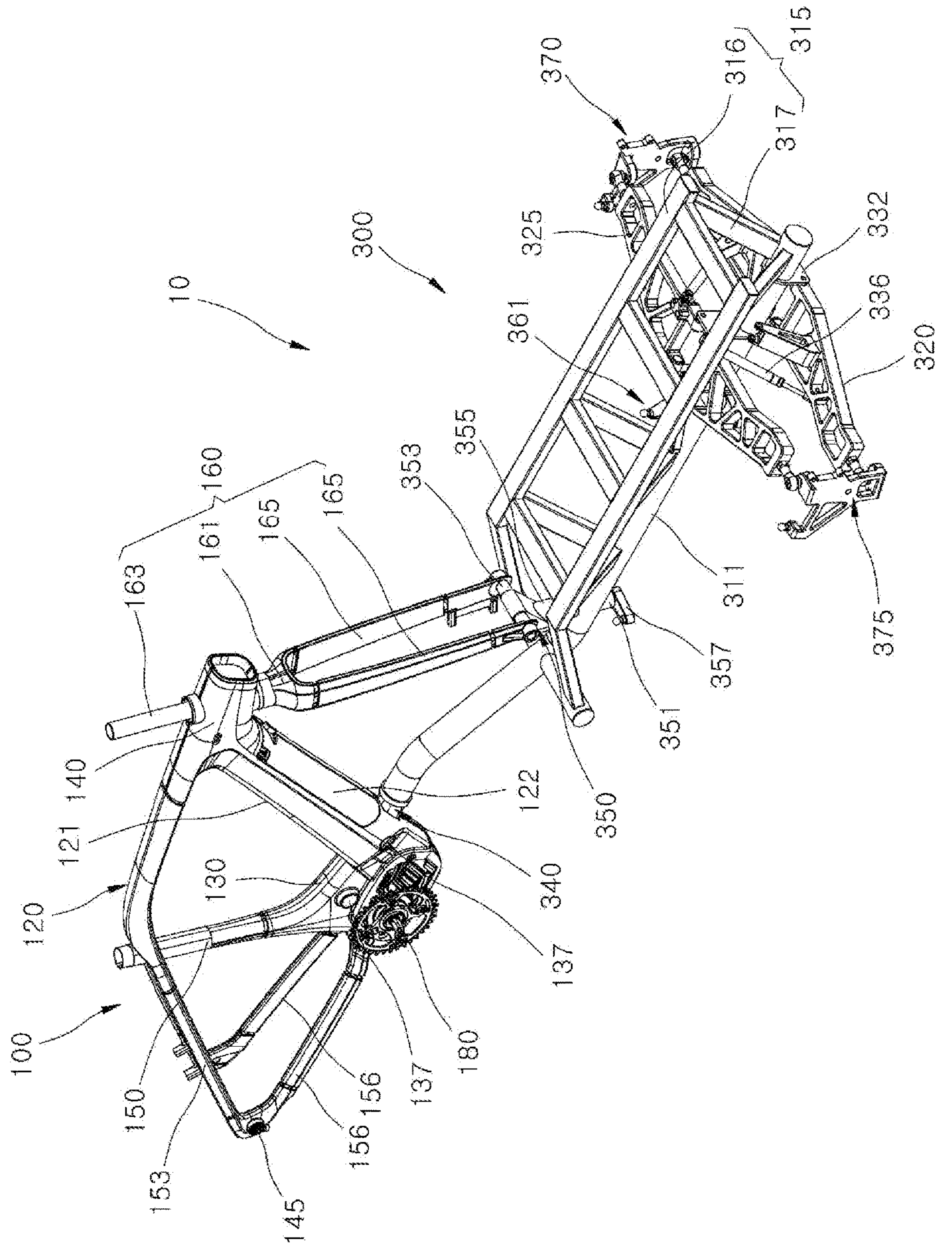
FIG. 4 is a perspective view of the cargo bicycle according to an embodiment of the present disclosure, viewed from the right.
Figure 5:
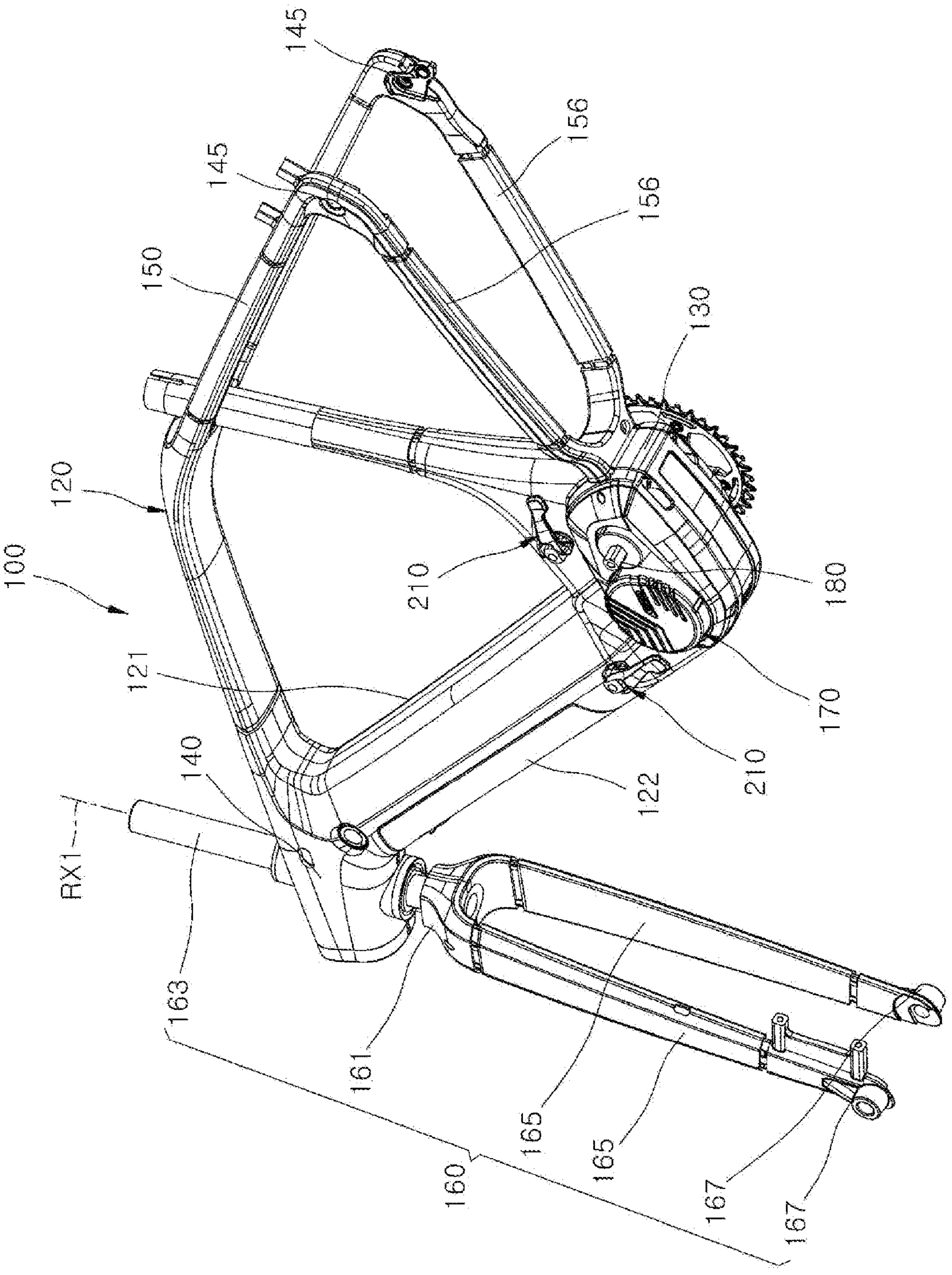
FIG. 5 is a perspective view illustrating the drive module for the bicycle according to an embodiment of the present disclosure.
Figure 6:
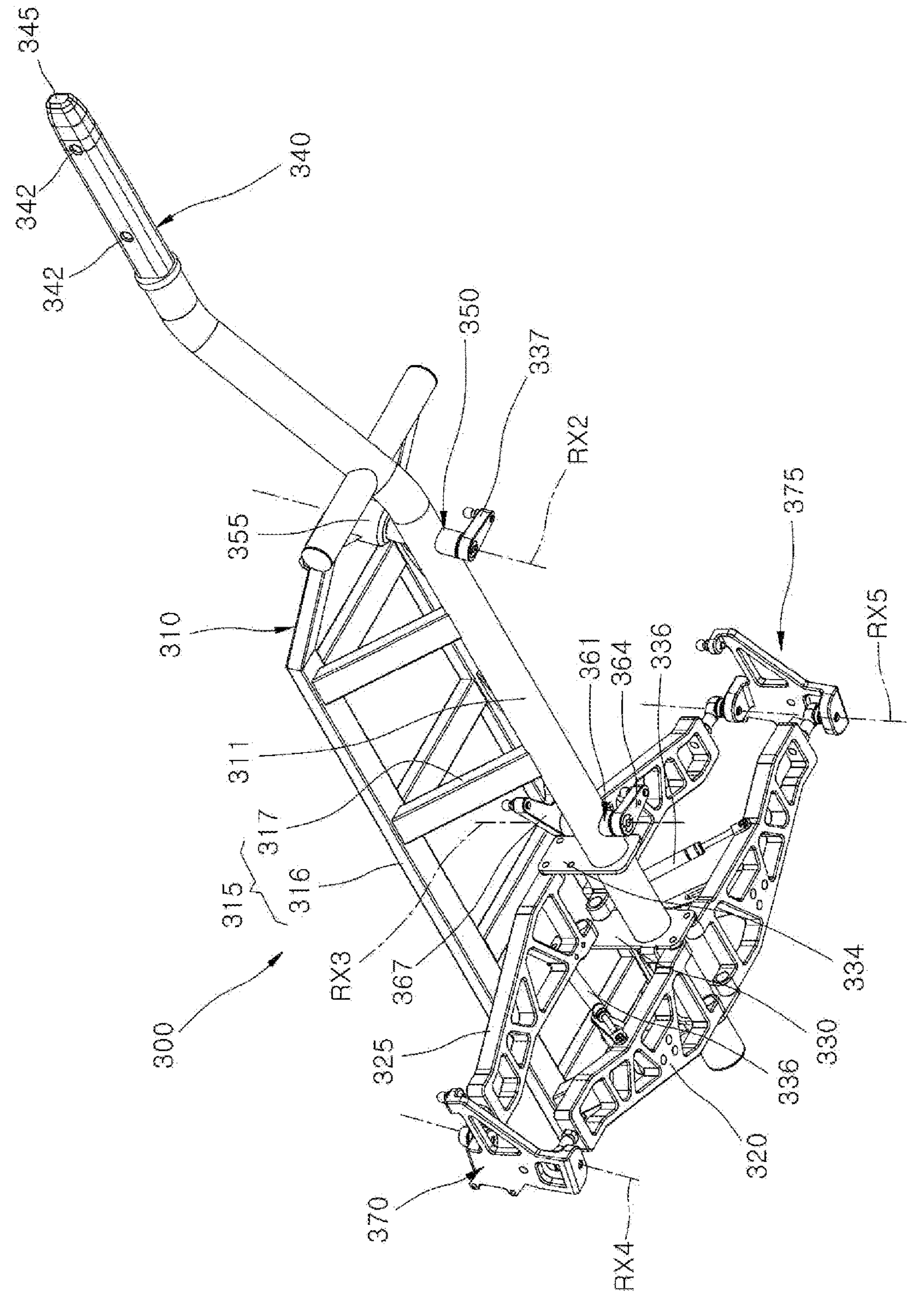
FIG. 6 is a perspective view illustrating the cargo module for the bicycle according to an embodiment of the present disclosure.
Figure 7:
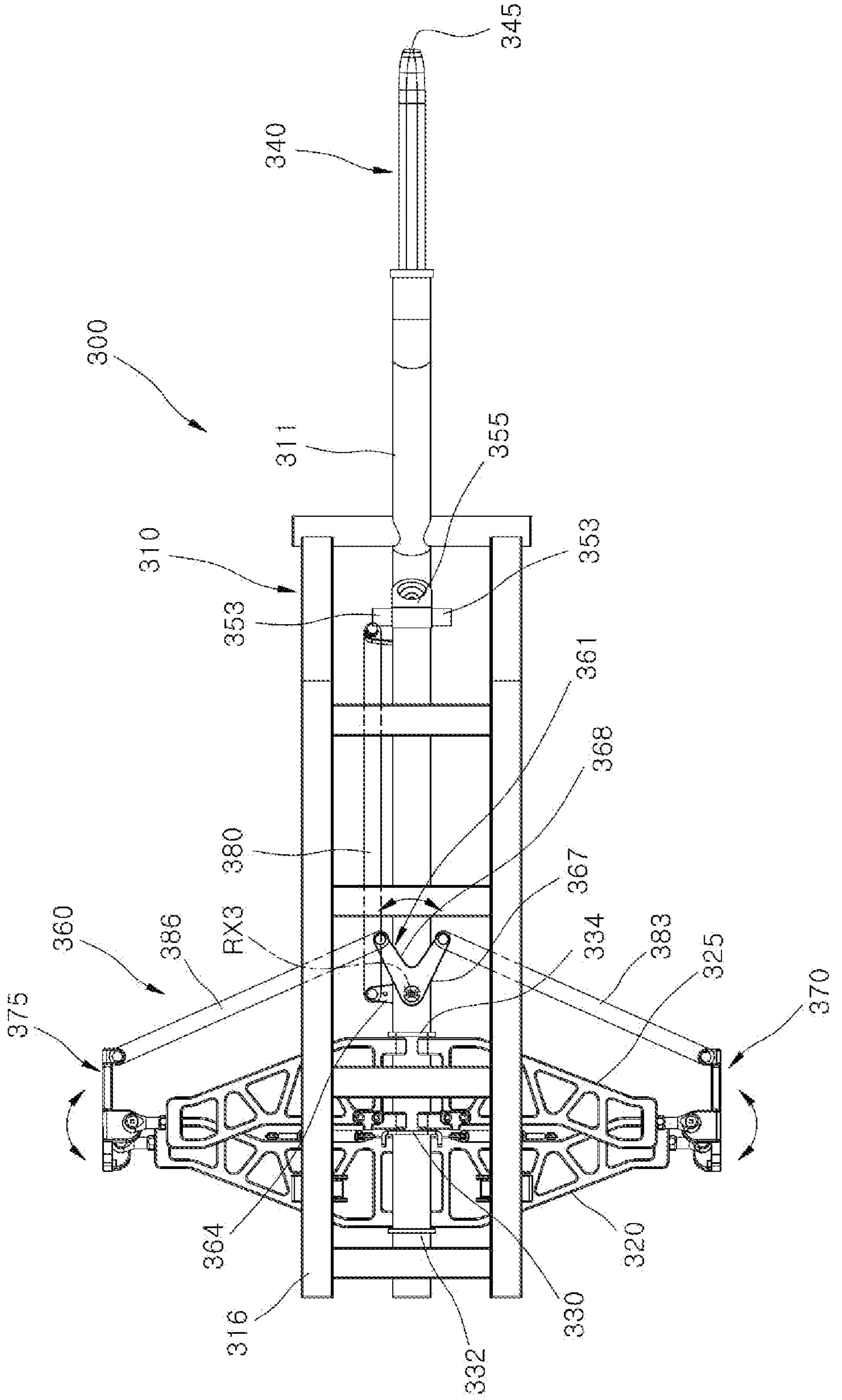
FIG. 7 is a plan view illustrating the cargo module for the bicycle according to an embodiment of the present disclosure, in which a central link, a left link, and a right link are indicated with solid lines.
Figure 8:
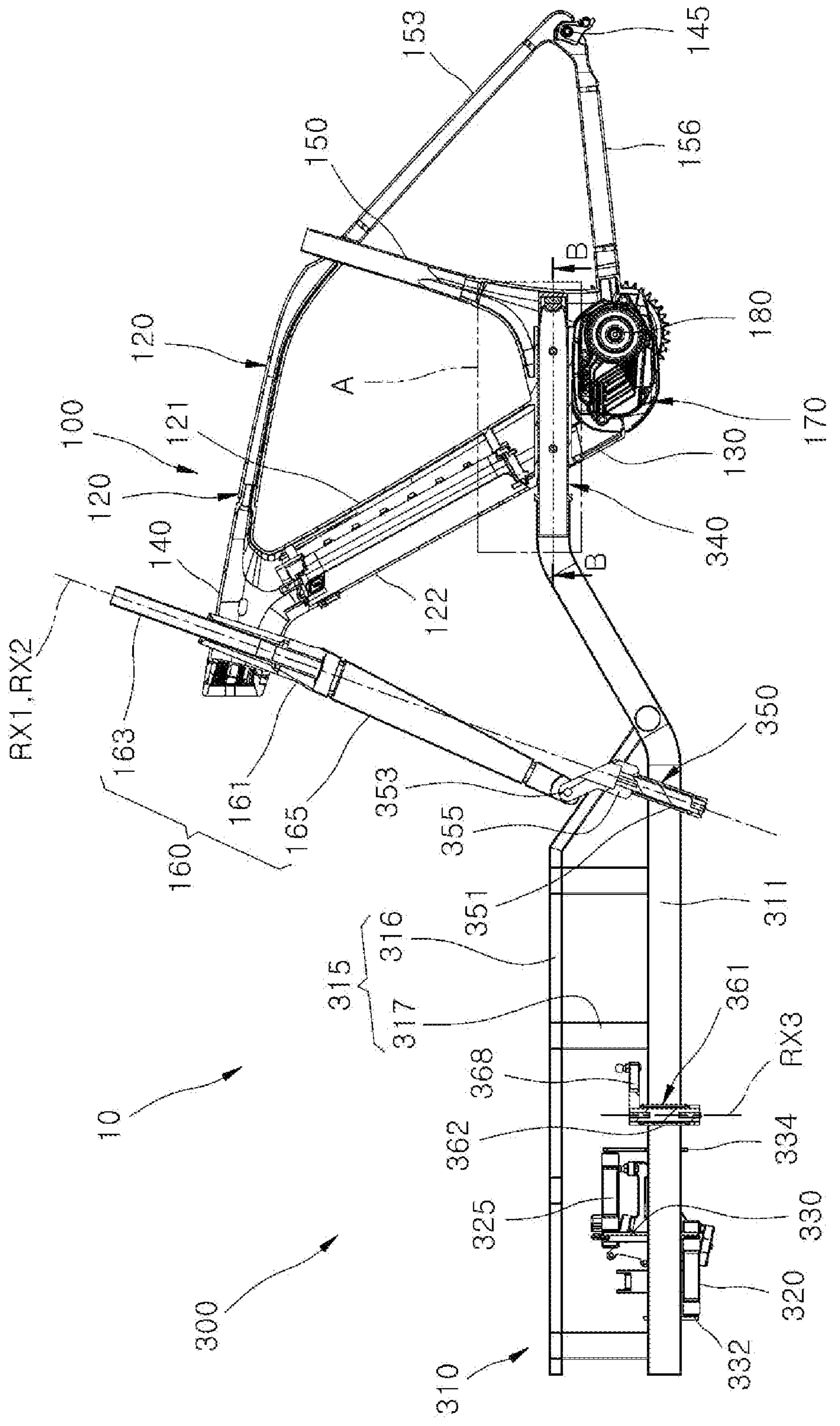
FIG. 8 is a longitudinal cross-sectional view illustrating the cargo bicycle according to an embodiment of the present disclosure.
Figure 9:
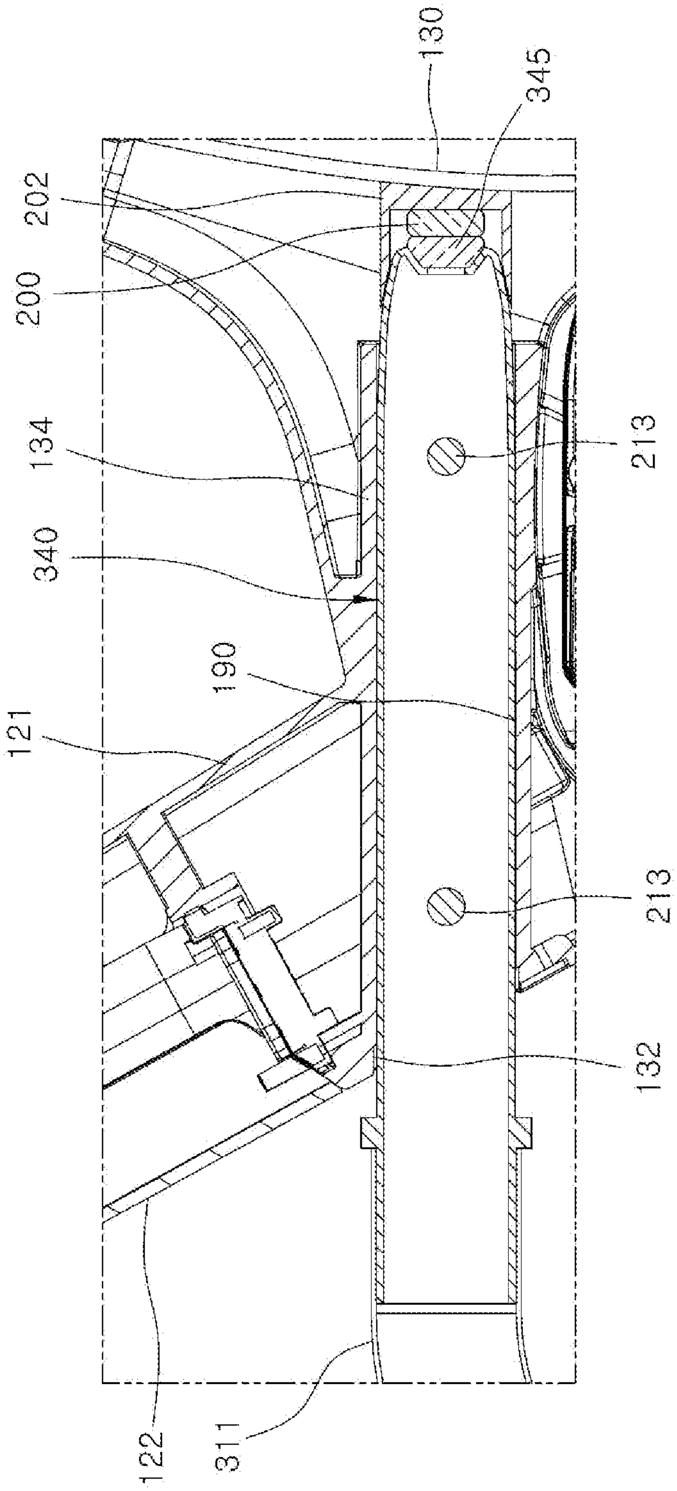
FIG. 9 is an enlarged cross-sectional view illustrating part A in FIG. 8.
Figure 10:
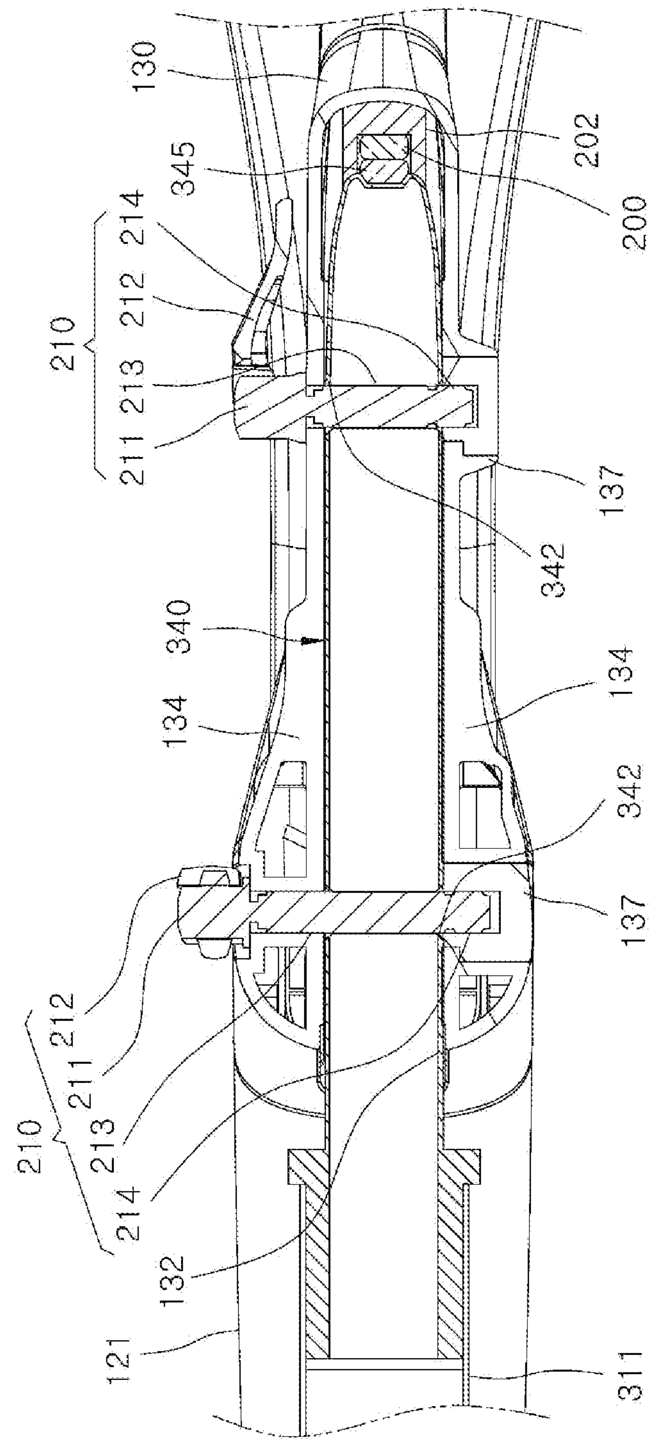
FIG. 10 is an enlarged cross-sectional view illustrating a part of FIG. 8 cut along line B-B.

FIG. 1 is a left side view illustrating a cargo bicycle according to an embodiment of the present disclosure, FIG. 2 is a right side view illustrating the cargo bicycle according to an embodiment of the present disclosure, FIG. 3 is a perspective view of the cargo bicycle according to an embodiment of the present disclosure, viewed from the left, FIG. 4 is a perspective view of the cargo bicycle according to an embodiment of the present disclosure, viewed from the right, FIG. 5 is a perspective view illustrating the drive module for the bicycle according to an embodiment of the present disclosure, FIG. 6 is a perspective view illustrating the cargo module for the bicycle according to an embodiment of the present disclosure, FIG. 7 is a plan view illustrating the cargo module for the bicycle according to an embodiment of the present disclosure, in which a central link, a left link, and a right link are indicated with solid lines, FIG. 8 is a longitudinal cross-sectional view illustrating the cargo bicycle according to an embodiment of the present disclosure, FIG. 9 is an enlarged cross-sectional view illustrating part A in FIG. 8, and FIG. 10 is an enlarged cross-sectional view illustrating a part of FIG. 8 cut along line B-B. In at least some figures of FIGS. 1 to 10, not all configurations included in the cargo bicycle are illustrated, and some configurations may be omitted for ease of description and illustration.

Referring to FIGS. 1 to 10, a cargo bicycle 10 according to an embodiment of the present disclosure includes a drive module 100 for a bicycle and a cargo module 300 for a bicycle configured to be detachably coupled to the drive module 100 for the bicycle. The drive module 100 for the bicycle (hereinafter, referred to as the "drive module") includes a bicycle frame 120, a main shaft 180, a rear wheel 101, and a fork 160.

The bicycle frame 120 may include a center post 121, a fork coupler 140, a main shaft coupler 130, a rear wheel coupler 145, a seat support 150, an upper reinforcement 153, and a lower reinforcement 156.

The center post 121 extends vertically and is inclined with respect to the vertical direction. The fork coupler 140 may be provided on the upper end portion of the center post 121, while the main shaft coupler 130 may be provided on the lower end portion of the center post 121.

The rear wheel coupler 145 may be provided behind the main shaft coupler 130. The seat support 150 may protrude upward from the main shaft coupler 130 with a backward inclination.

The upper reinforcement 153 may connect the fork coupler 140 and the rear wheel coupler 145 to enhance the strength of the bicycle frame 120. The lower reinforcement 156 may connect the main shaft coupler 130 and the rear wheel coupler 145 to increase the strength of the bicycle frame 120.

The main shaft 180 may be rotatably disposed on the bicycle frame 120. Specifically, the main shaft 180 may be supported on the main shaft coupler 130 to extend through the main shaft coupler 130 in the transverse direction.

The rear wheel 101 is rotatably supported on the bicycle frame 120 and is rotated by the rotational force of the main shaft 180. The rear wheel 101 may be rotatably coupled to the rear wheel coupler 145. Although the bicycle drive module 100 only including a single rear wheel 101 is illustrated in the figures, this is for illustrative purposes only, and the bicycle drive module of the present disclosure may include a plurality of rear wheels.

The drive module 100 may further include a pedal 115, a drive sprocket, a driven sprocket, a chain, and a seat 105.

The pedal 115 may be coupled to the main shaft 180. The drive sprocket may be fixedly coupled to the main shaft 180 to coaxially rotate as the main shaft 180 rotates.

The driven sprocket may be fixedly coupled to the rear wheel shaft serving as the center of rotation of the rear wheel 101. As the driven sprocket rotates, the rear wheel 101 may rotate along with the driven sprocket. The chain may be fastened around both the drive sprocket and the driven sprocket and connect the drive sprocket and the driven sprocket to transmit the rotational force from the drive sprocket to the driven sprocket.

When a user depresses the pedal 115, the main shaft 180 rotates, and the rotational force from the main shaft 180 is transmitted to the rear wheel 101 via the drive sprocket, the chain, and the driven sprocket, thereby rotating the rear wheel 101. The seat 105 is configured to support the buttocks of the user, and may be coupled to and supported on the upper end portion of the seat support 150.

The fork 160 is rotatably coupled to the bicycle frame 120. The fork 160 may include a joint 161, a steering handle coupling tube 163, and a pair of fork prongs 165.

The joint 161 extends through the fork coupler 140 upward and downward and is rotatably coupled to the bicycle frame 120. The steering handle coupling tube 163 extends upward from the joint 161. The fork 160 may rotate along a first axis RX1 extending in the longitudinal direction of the steering handle coupling tube 163.

The pair of fork prongs 165 are spaced away from each other while extending downward from the joint 161.

The pair of fork prongs 165 extend downward from the joint 161 and are spaced away from each other. A fork connecting part 350 of the cargo module 300 for the bicycle described below may be detachably coupled to lower end portions 167 of the pair of fork prongs 165. A front wheel (not shown) may be detachably coupled to the lower end portions 167 of the pair of fork prongs 165, in place of the fork connecting part 350.

The drive module 100 may further include a steering handle 110. The steering handle 110 may be coupled to and supported on the upper end portion of the steering handle coupling tube 163. When the steering handle 110 rotates to the left or right, the fork 160 may rotate along with the first axis RX1, and cargo front wheels 301 and 303 of the cargo module 300 for the bicycle described below may be steered in a direction and angle of rotation corresponding to the direction and angle of rotation of the fork 160.

The drive module 100 may further include an electric actuator 170, a main battery 230, and a controller 235. The electric actuator 170 may rotate the main shaft 180 using electrical energy. The electric actuator 170 may be disposed in the interior space of the main shaft coupler 130. The electric actuator 170 may include a motor providing rotational power to the main shaft 180.

The main battery 230 may store electrical energy to be supplied to the electric actuator 170. For example, the main battery 230 may be disposed within a center post 121 of the bicycle frame 120. The main battery 230 may be removably disposed in a battery compartment inside the center post 121. The center post 121 may include a battery cover 122 openable to expose the battery compartment.

The controller 235 may control the operation of the electric actuator 170. For this purpose, the controller 235 may control current supplied to the electric actuator 170 from the main battery 230 or an auxiliary battery 305 of the cargo module 300 for the bicycle described below.

The controller 235 may further include a parallel connecting converter connecting the main battery 230 and the auxiliary battery 305 when the cargo module 300 for the bicycle is coupled to the drive module 100. For example, the controller 235 may be disposed within the center post 121.

The cargo module 300 for the bicycle (hereinafter, referred to as a "cargo module") may include a base 310, a connecting beam 340, the fork connecting part 350, a pair of cargo front wheels 301 and 303, and a steering unit 360. The base 310 may include a center bar 311, a cargo frame 315, a lower front wheel frame 320, and an upper front wheel frame 325.

The center bar 311 is a tubular member having a circular cross-section, and extends in the front-back direction. The cargo frame 315 is a component supporting a cargo basket 307, and is fixedly coupled to the center bar 311. The cargo frame 315 may include a pallet part 316 above the center bar 311 and connecting beams 317 connecting the pallet part 316 to the center bar 311.

The lower front wheel frame 320 and the upper front wheel frame 325 may extend in a direction intersecting the center bar 311, i.e., in the left and right direction. The lower front wheel frame 320 may be disposed below the center bar 311, while the upper front wheel frame 325 may be disposed above the center bar 311 and below the pallet part 316.

The lower front wheel frame 320 and the upper front wheel frame 325 may be connected to the center bar 311 so as to be rotatable about the center bar 311. Specifically, the lower front wheel frame 320 and the upper front wheel frame 325 may be supported on the center bar 311 by means of an intermediate bracket 330, a front bracket 332, and a rear bracket 334 through which the center bar 311 is threaded.

The intermediate bracket 330 may have the upper portion coupled to the upper front wheel frame 325 and the lower portion coupled to the lower front wheel frame 320, with a portion thereof between the upper and lower ends being threaded by the center bar 311. The front bracket 332 may have the lower portion coupled to the lower front wheel frame 320 and the upper portion threaded by the center bar 311. The rear bracket 334 may have the upper portion coupled to the upper front wheel frame 325 and the lower portion threaded by the center bar 311.

The base 310 may further include a pair of shock absorbers 336 connecting the lower front wheel frame 320 and the upper front wheel frame 325 in a bufferable manner The connecting beam 340 protrudes backward from the base 310. Specifically, the connecting beam 340 protrudes and extends backward from the rear end of the center bar 311. The rear end portion of the connecting beam 340 is removably inserted into a beam insertion hole 190 provided in the bicycle frame 120.

Although only a single beam insertion hole 190 is provided in the main shaft coupler 130 in FIGS. 1, 2, and 8 to 10, this is for illustrative purposes only, and the present disclosure is not limited to this structure. For example, the beam insertion hole may be provided in the fork coupler 140 located higher than the main shaft coupler 130, and the connecting beam may be inserted into the beam insertion hole provided in the fork coupler 140. Alternatively, beam insertion holes may be provided in the main shaft coupler 130 and the fork coupler 140, and a pair of connecting beams may be inserted into the beam insertion hole provided in the main shaft coupler 130 and the beam insertion hole provided in the fork coupler 140, respectively.

The fork connecting part 350 has one side rotatably supported on the base 310 and the other side detachably coupled to the fork 160. The fork connecting part 350 may include a base penetration pin 351, a fork coupling tube 353, a joint 355, and a lower finger 357.

The base penetration pin 351 extends with an inclination and penetrates the center bar 311. The fork connecting part 350 may rotate about a second axis RX2 extending in the longitudinal direction of the base penetration pin 351. The fork coupling tube 353 may extend in a horizontal direction perpendicular to the second axis RX2, and left and right ends thereof may be fitted around the fork 160, specifically, the lower end portions 167 of the pair of fork prongs 165, respectively.

The fork coupling tube 353 may be firmly coupled to the lower end portions 167 of the pair of fork prongs 165, for example, in a through-axle manner. The fork coupling tube 353 is located above the base penetration pin 351.

The joint 355 connects the fork coupling tube 353 and the base penetration pin 351. The lower finger 357 protrudes from the lower end portion of the base penetration pin 351 in a direction perpendicular to the second axis RX2. When the fork coupling tube 353 is coupled to the fork 160, the first axis RX1 and the second axis RX2 are connected in a straight line.

Accordingly, when the user rotates the steering handle 110 to the left or right about the first axis RX1, the fork connecting part 350 may rotate in the same direction and at the same angle about the second axis RX2.

The pair of cargo front wheels 301 and 303 are disposed on both sides of the base 310 in the widthwise direction with a space therebetween. Specifically, a left steering knuckle 370 may be coupled to the left end portions of the upper front wheel frame 325 and the lower front wheel frame 320 by means of a pair of ball joints, and a right steering knuckle 375 may be coupled to the right end portions of the upper front wheel frame 325 and the lower front wheel frame 320 by means of a pair of ball joints.

The left cargo front wheel 301 may be rotatably coupled to the left steering knuckle 370, and the right cargo front wheel 303 may be rotatably coupled to the right steering knuckle 375. Accordingly, the left cargo front wheel 301 may be steered and rotated about a left axis RX4 connecting the pair of ball joints of the left steering knuckle 370. The right cargo front wheel 303 may be steered and rotated about a right axis RX5 connecting the pair of ball joints of right steering knuckle 375.

The steering unit 360 changes the steering angle of the pair of cargo front wheels 301 and 303 to correspond to the rotation angle of the fork connecting part 350 centered on the second axis RX2.

The steering unit 360 may include the left steering knuckle 370, the right steering knuckle 375, a central steering part 361, a center link 380, a left steering link 383, and a right steering link 386.

The central steering part 361 may extend through the center bar 311 of the base 310 and be rotatably supported on the center bar 311. The central steering part 361 may include a base coupling pin 362, a lower finger 364, a left upper finger 367, and a right upper finger 368.

The base coupling pin 362 may extend along a third axis RX3 in the vertical direction and through the center bar 311 upward and downward. The lower finger 364 protrudes from the lower end portion of the base coupling pin 362 in a direction perpendicular to the third axis RX3.

The left upper finger 367 may protrude rearwardly to the left with an inclination from the upper end portion of the base coupling pin 362 while being perpendicular to the third axis RX3, and the right upper finger 368 may protrude rearwardly to the right with an inclination from the upper end portion of the base coupling pin 362 while being perpendicular to the third axis RX3. The left upper finger 367 and the right upper finger 368 may be provided as a single member, as illustrated in FIG. 7, or may be provided as a pair of separate members, differing from the illustration in FIG. 7.

When the base coupling pin 362 rotates about the third axis RX3, the lower finger 364, left upper finger 367, and right upper finger 368 may rotate together in the same direction and at the same angle.

The center link 380 may connect the lower finger 357 of the fork connecting part 350 and the lower finger 364 of the central steering part 361. In other words, one end portion of the center link 380 may be connected to the lower finger 357 of the fork connecting part 350 by means of a ball joint, while the other end portion of the center link 380 may be connected to the lower finger 364 of the central steering part 361 by means of a ball joint.

The left steering link 383 may connect the left upper finger 367 of the central steering part 361 and the left steering knuckle 370, while the right steering link 386 may connect the right upper finger 368 of the central steering part 361 and the right steering knuckle 375.

In other words, one end portion of the left steering link 383 may be connected to the left upper finger 367 of the central steering part 361 by means of a ball joint, while the other end portion of the left steering link 383 may be connected to the rear end portion of the left steering knuckle 370 by means of a ball joint. One end portion of the right steering link 386 may be connected to the right upper finger 368 of the central steering part 361 by means of a ball joint, while the other end portion of the right steering link 386 may be connected to the rear end portion of the right steering knuckle 375 by means of a ball joint.

The left steering knuckle 370 and the right steering knuckle 375 have already been described, and thus a repeated description thereof will be omitted. With this configuration, when the fork connecting part 350 rotates to the left or right about the second axis RX2 in response to the user rotating the steering handle 110 to the left or right, the central steering part 361 rotates to the left or right about the third axis RX3.

In addition, the left steering knuckle 370 and the left cargo front wheel 301 supported thereon and the right steering knuckle 375 and the right cargo front wheel 303 supported thereon may rotate together to the left or right to the same angle. Consequently, the cargo bicycle 10 may be steered to the left or right.

The cargo bicycle 10 may further include the cargo basket 307 and the auxiliary battery 305. The cargo basket 307 designed for holding luggage may be detachably supported or seated on the pallet portion 316 of the cargo frame 315. The bicycle 10 may further include a baby seat designed for seating an infant or a child thereon, in place of the cargo basket 307.

The auxiliary battery 305 may store therein electrical energy supplied to the electric actuator 170. For example, the auxiliary battery 305 may be disposed in a hollow space provided in the cargo frame 315. For example, the auxiliary battery 305 may be disposed below the pallet part 316 and located between the pallet part 316 and the center bar 311.

The drive module 100 for the bicycle may further include a coupling pin 210. When the connecting beam 340 is inserted into the beam insertion hole 190 through an opening 132 open forwardly to the bicycle frame 120, the coupling pin 210 may extend through the bicycle frame 120 and the connecting beam 340 and be fixed to the bicycle frame 120 to prevent the connecting beam 340 from being removed from the beam insertion hole 190.

The connecting beam 340 may have a pinhole 342 through which the coupling pin 210 extends. A plurality of coupling pins 210 may be provided, and a plurality of pinholes 342, the number of which corresponds to the number of the coupling pins 210, may be also provided.

Each of the coupling pins 210 may include a head 211, a body 213, a handle 212, and a fixing portion 214. The body 213 may be a cylindrical portion having a predetermined diameter, and may extend in a direction in which the body 213 extends through the pinhole 342. The head 211 may be provided on one end portion of the body 213 and have a diameter greater than the diameter of the body 213 to prevent the body 213 from extending through the pinhole 342.

The handle 212 is a portion to be grasped when the user intends to inserted the coupling pin 210 into the pinhole 342. The handle may be connected to head 211. The fixing portion 214 is detachably coupled to the bicycle frame 120 to prevent the coupling pin 210 from being unintentionally detached from the bicycle frame 120. The fixing portion 214 may be provided on the other end portion of the body 213.

The bicycle frame 120 may have a pin through-hole 135 allowing the body 213 of the coupling pin 210 to extend therethrough. The bicycle frame 120 may be provided with a fixing portion receptacle 137 to which the fixing portion 214 of the coupling pin 210 is detachably coupled. The pin through-hole 135 and the fixing portion receptacle 137 are components of the bicycle frame 120, and may be provided in an internal guide 134 limiting the beam insertion hole 190.

The user inserts the connecting beam 340 into the beam insertion hole 190 through the opening 132, and pushes the connecting beam 340 into the beam insertion hole 190 so that the pin through-hole 135 and pinhole 342 are aligned. Then, the user grasps the handle 212 of the coupling pin 210, pushes the coupling pin 210 so that the fixing portion 214 reaches the fixing portion receptacle 137 through the pin through-hole 135 and the pinhole 342, and rotates the handle 212 in a single direction about the body 213 so that the fixing portion 214 is coupled to the fixing portion receptacle 137.

The user may use the cargo bicycle 10 by coupling the cargo module 300 for the bicycle to the drive module 100 for the bicycle in this manner.

The cargo module 300 for the bicycle may further include a beam-side terminal 345 provided on the connecting beam 340, while the drive module 100 for the bicycle may further include a hole-side terminal 200 provided within the bicycle frame 120.

For example, the beam-side terminal 345 may be disposed on the distal end portion of the connecting beam 340, and when the connecting beam 340 is inserted into the beam insertion hole 190, the hole-side terminal 200 may be disposed at an internal point of the bicycle frame 120 facing the beam-side terminal 345. Accordingly, when the connecting beam 340 is inserted into the beam insertion hole 190, the beam-side terminal 345 and the hole-side terminal 200 contact each other to establish an electrical connection, and thus the main battery 230 and the auxiliary battery 305 may be connected in parallel.

In other words, after the connecting beam 340 is inserted into the beam insertion hole 190 and the connecting beam 340 is fixed using the coupling pin 210, the main battery 230, the controller 235, and the auxiliary battery 305 may be electrically connected without additional work of connecting a connector of the drive module 100 for the bicycle and a connector of the cargo module 300 for the bicycle.

The hole-side terminal 200 may be supported on an internal guide 202 fixed on the inner surface of the bicycle frame 120. The internal guide 202 may guide the distal end portion of the connecting beam 340 so that the beam-side terminal 345 is aligned with the hole-side terminal 200. In addition, the internal guide 202 may include a buffering portion made of an elastic material to absorb shock when the beam-side terminal 345 collides with the hole-side terminal 200.

The positions of the beam-side terminal 345 and the hole-side terminal 200 illustrated in FIGS. 9 and 10 are illustrative, and the present disclosure is not limited to the positions of the beam-side terminal 345 and the hole-side terminal 200 illustrated in FIGS. 9 and 10. For example, the beam-side terminal may be disposed on a side surface of the connecting beam 340, and the hole-side terminal may be disposed on the internal guide 134 defining the beam insertion hole 190 to contact the beam-side terminal.

In addition, after the connecting beam 340 is removed from the beam insertion hole 190 and the fork connecting part 350 is disconnected from the fork 160, the user may use a two-wheeled bicycle in which the drive module 100 for the bicycle is coupled to the front wheel by detachably coupling a front wheel (not shown), the size of which corresponds to the size of the rear wheel 101, to the fork 160.

According to the present disclosure as set forth above, the user may use the cargo bicycle 10 by coupling the drive module 100 for the bicycle and the cargo module 300 for the bicycle or use the recreational or transportation two-wheeled bicycle by coupling a front wheel (not shown) to the drive module 100 for the bicycle. Accordingly, costs may be reduced compared to the case in which the user purchases the cargo bicycle 10 and a separate two-wheeled bicycle.

According to the present disclosure, the main battery 230 is provided on the drive module 100 for the bicycle and the auxiliary battery 305 is provided on the cargo module 300 for the bicycle, so the cargo bicycle 10 may be used in a motorized mode for an extended time and carry heavy loads over long distances in an easy manner.

In the cargo bicycle 10 according to the present disclosure, the drive module 100 for the bicycle includes the hole-side terminal 200 and the cargo module 300 for the bicycle includes the beam-side terminal 345, and when the connecting beam 340 is fixedly inserted into the beam insertion hole 190, the hole-side terminal 200 and the beam-side terminal 345 contact each other to establish an electrical connection.

Accordingly, after the connecting beam 340 is inserted into the beam insertion hole 190 and the connecting beam 340 is fixed using the coupling pin 210, additional work of connecting the connector of the drive module 100 for the bicycle and the connector of the cargo module 300 for the bicycle is not required. Accordingly, conversion to the cargo bicycle 10 may be facilitated, and the bicycle may be ridden safely without any accident in which the connectors are disconnected during the operation of the cargo bicycle 10.

While the present disclosure has been described with respect to the embodiments illustrated in the drawings, such embodiments are provided by way of example only. It will be understood by those skilled in the art that various modifications and other equivalent embodiments are possible therefrom. Therefore, the technical protection scope of the present disclosure should be defined by the following claims.

What is claimed is:

1. A drive module for a bicycle, the drive module comprising:

a bicycle frame comprising a beam insertion hole into which a connecting beam is removably inserted;

a main shaft rotatably provided on the bicycle frame;

a rear wheel rotatably supported on the bicycle frame and configured to be rotated by rotational force from the main shaft; and a fork rotatably coupled to the bicycle frame, wherein the connecting beam comprises a beam-side terminal for an electrical connection, the bicycle frame comprises therein a hole-side terminal, and the connecting beam is configured to be inserted into the beam insertion hole, such that the beam-side terminal and the hole-side terminal contact each other to establish the electrical connection.

2. The drive module of claim 1, further comprising:

an electric actuator configured to rotate the main shaft using electrical energy; and a main battery storing the electrical energy to be supplied to the electric actuator.

3. The drive module of claim 1, further comprising a coupling pin configured to extend through the bicycle frame and the connecting beam to prevent the connecting beam from being removed from the beam insertion hole.

4. A cargo module for a bicycle, the cargo module comprising:

a base;

a connecting beam protruding from the base and configured to be inserted into a beam insertion hole provided in a drive module for the bicycle;

a fork connecting part configured such that one side thereof is rotatably supported on the base and the other side thereof is detachably coupled to the drive module for the bicycle;

a pair of cargo front wheels disposed on both sides of the base in a widthwise direction of the bicycle with a space therebetween; and a steering unit configured to change a steering angle of the pair of cargo front wheels to correspond to a rotation angle of the fork connecting part, wherein the drive module for the bicycle comprises therein a hole-side terminal, the connecting beam comprises a beam-side terminal for an electrical connection, and the connecting beam is configured to be inserted into the beam insertion hole, such that the beam-side terminal and the hole-side terminal contact each other to establish the electrical connection.

5. The cargo module of claim 4, further comprising an auxiliary battery storing electrical energy.

6. A cargo bicycle comprising:

a drive module for a bicycle, wherein the drive comprises a bicycle frame comprising a beam insertion hole, a main shaft rotatably provided on the bicycle frame, a rear wheel rotatably supported on the bicycle frame and configured to be rotated by rotational force from the main shaft, and a fork rotatably coupled to the bicycle frame; and a cargo module for the bicycle, wherein the cargo module comprises a base, a connecting beam protruding from the base and configured to be inserted into the beam insertion hole, a fork connecting part configured such that one side thereof is rotatably supported on the base and the other side thereof is detachably coupled to the fork, a pair of cargo front wheels disposed on both sides of the base in a widthwise direction of the bicycle with a space therebetween, and a steering unit configured to change a steering angle of the pair of cargo front wheels to correspond to a rotation angle of the fork connecting part, wherein the drive module for the bicycle comprises a hole-side terminal disposed within the bicycle frame, the cargo module for the bicycle comprises a beam-side terminal disposed on the connecting beam, and the connecting beam is configured to be inserted into the beam insertion hole, such that the beam-side terminal and the hole-side terminal contact each other to establish an electrical connection.

7. The cargo bicycle of claim 6, wherein the drive module for the bicycle further comprises:

an electric actuator configured to rotate the main shaft using electrical energy; and a main battery storing the electrical energy to be supplied to the electric actuator.

8. The cargo bicycle of claim 7, wherein the cargo module for the bicycle further comprises an auxiliary battery storing electrical energy to be supplied to the electric actuator.

9. The cargo bicycle of claim 8, wherein the main battery and the auxiliary battery are connected to each other in parallel through the electrical connection.

10. The cargo bicycle of claim 6, wherein the drive module for the bicycle further comprises a coupling pin configured to extend through the bicycle frame and the connecting beam to prevent the connecting beam from being removed from the beam insertion hole.

* * * * *